(12) United States Patent
Dhar et al.

(10) Patent No.: US 8,619,584 B2
(45) Date of Patent: Dec. 31, 2013

(54) LOAD BALANCING OVER DCE MULTIPATH ECMP LINKS FOR HPC AND FCOE

(75) Inventors: Sandeep Dhar, Karnataka (IN); Dinesh G. Dutt, Sunnyvale, CA (US); Sanjay Sane, Fremont, CA (US); Adam Hutchin, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 586 days.

(21) Appl. No.: 12/771,853

(22) Filed: Apr. 30, 2010

(65) Prior Publication Data

US 2011/0267947 A1 Nov. 3, 2011

(51) Int. Cl.
*H04J 1/16* (2006.01)
(52) U.S. Cl.
USPC .......................................... 370/238; 370/235
(58) Field of Classification Search
USPC .......................................... 370/230, 235, 237
See application file for complete search history.

(56) References Cited

U.S. PATENT DOCUMENTS

| 7,266,635 | B1 * | 9/2007 | Medina ........................ 711/108 |
| 7,760,735 | B1 * | 7/2010 | Chen et al. ................... 370/392 |
| 7,940,661 | B2 * | 5/2011 | Ervin et al. ................... 370/232 |
| 8,069,304 | B2 * | 11/2011 | Panchalingam et al. ...... 711/108 |
| 2007/0140131 | A1 * | 6/2007 | Malloy et al. ................. 370/241 |
| 2008/0025309 | A1 * | 1/2008 | Swallow ....................... 370/392 |
| 2008/0270421 | A1 * | 10/2008 | Ushiyama ...................... 707/10 |
| 2010/0034100 | A1 * | 2/2010 | Beyers .......................... 370/250 |
| 2011/0063979 | A1 * | 3/2011 | Matthews et al. ............. 370/237 |

* cited by examiner

*Primary Examiner* — Phuc Tran
(74) *Attorney, Agent, or Firm* — Patterson &Sheridan, LLP

(57) ABSTRACT

Methods and apparatus for generating different hash values in an effort to achieve better load balancing among various paths in a data center environment, such as Data Center Ethernet (DCE) with Layer 2 Multipathing (L2MP), supporting equal-cost multipath (ECMP) routing are provided. In this manner, the data center environment may attain better network utilization for high-performance computing (HPC), storage area network (SAN), and/or local area network (LAN) traffic.

19 Claims, 4 Drawing Sheets

LOAD BALANCING OVER DCE MULTIPATH ECMP LINKS FOR HPC AND FCOE

TECHNICAL FIELD

Embodiments described in this disclosure generally relate to network communications and, more particularly, to load balancing data traffic over equal-cost multipath routing (ECMP) links in data center environments.

BACKGROUND

Data centers typically run multiple separate networks, including an Ethernet network for client-to-server and server-to-server communications and a fibre channel (FC) storage area network (SAN). Ethernet networks are generally implemented when end-users are transferring relatively small amounts of information over both local and global distances or in clustered, low-latency computer environments. SANs, on the other hand, are implemented by companies who require access to block I/O for applications such as booting over SANs, mail servers, file servers, and large databases. Deploying SANs has a number of benefits including: (1) centralized management, security, and administration of the storage resources, (2) uniform delivery of storage services such as periodic backups, and (3) running efficient utilization levels of storage resources.

Traditional Ethernet is the primary network protocol in data center environments for server-to-server communications. However, Ethernet is designed to be a best-effort network protocol that may drop packets or deliver packets out of order when the network or devices are busy. Therefore, enhancements to Ethernet have been evolving to add extensions to the existing network protocol for greater reliability, among other things, under the direction of the Data Center Bridging (DCB) Task Group (TG) of the IEEE 802.1 Working Group. Beyond the benefits to traditional application traffic, these enhancements make Ethernet a viable transport for storage and server cluster traffic.

Originally coined and trademarked by Cisco Systems, Inc., Data Center Ethernet (DCE™) is one of the terms used to describe enhanced Ethernet. DCE refers to enhanced Ethernet based on the Data Center Bridging standards and also includes a Layer 2 Multipathing (L2MP) implementation based on the Internet Engineering Task Force's (IETF's) Transparent Interconnection of Lots of Links (TRILL) proposal. L2MP is an enhancement to increase the bisectional bandwidth between data center nodes by enabling multiple parallel paths between nodes and eliminating the single-path requirement and slow convergence of Spanning Tree Protocol (STP).

Overview

Embodiments of the present disclosure generally relate to increasing equal-cost multipath routing (ECMP) network utilization of alternate communication paths in data center environments.

One embodiment of the present disclosure provides a method of network communications. The method generally includes generating two or more different hash values for forwarding packets from a first network device to a second network device along two or more paths having equal routing cost and supporting data center bridging, forwarding a first packet along a first one of the paths based on a first one of the hash values, and forwarding a second packet along a second one of the paths based on a second one of the hash values. Generating the hash values may include using a first unique bridge identifier (ID) of a first network bridge in the first one of the paths to generate the first one of the hash values and using a second unique bridge ID of a second network bridge in the second one of the paths to generate the second one of the hash values.

Another embodiment of the present disclosure provides an apparatus. The apparatus generally includes logic configured to generate two or more different hash values for forwarding data from the apparatus to a network device along two or more paths having equal routing cost and supporting data center bridging, to forward a first packet along a first one of the paths based on a first one of the hash values, and to forward a second packet along a second one of the paths based on a second one of the hash values.

Yet another embodiment of the present disclosure provides a system. The system generally includes a first network device, a second network device, and two or more paths between the first and second network devices. The first network device typically includes logic configured to generate two or more different hash values for forwarding data from the first network device to the second network device along the two or more paths having equal routing cost and supporting data center bridging, to forward a first packet to the second network device along a first one of the paths based on a first one of the hash values, and to forward a second packet to the second network device along a second one of the paths based on a second one of the hash values.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure provide for generating different hash values in an effort to achieve better load balancing among various paths in a data center environment, such as Data Center Ethernet (DCE) with Layer 2 Multipathing (L2MP), supporting equal-cost multipath (ECMP) routing. In this manner, the data center environment may attain better network utilization for high-performance computing (HPC), storage area network (SAN), and/or local area network (LAN) traffic.

An Example Data Center Environment

Figure 1:
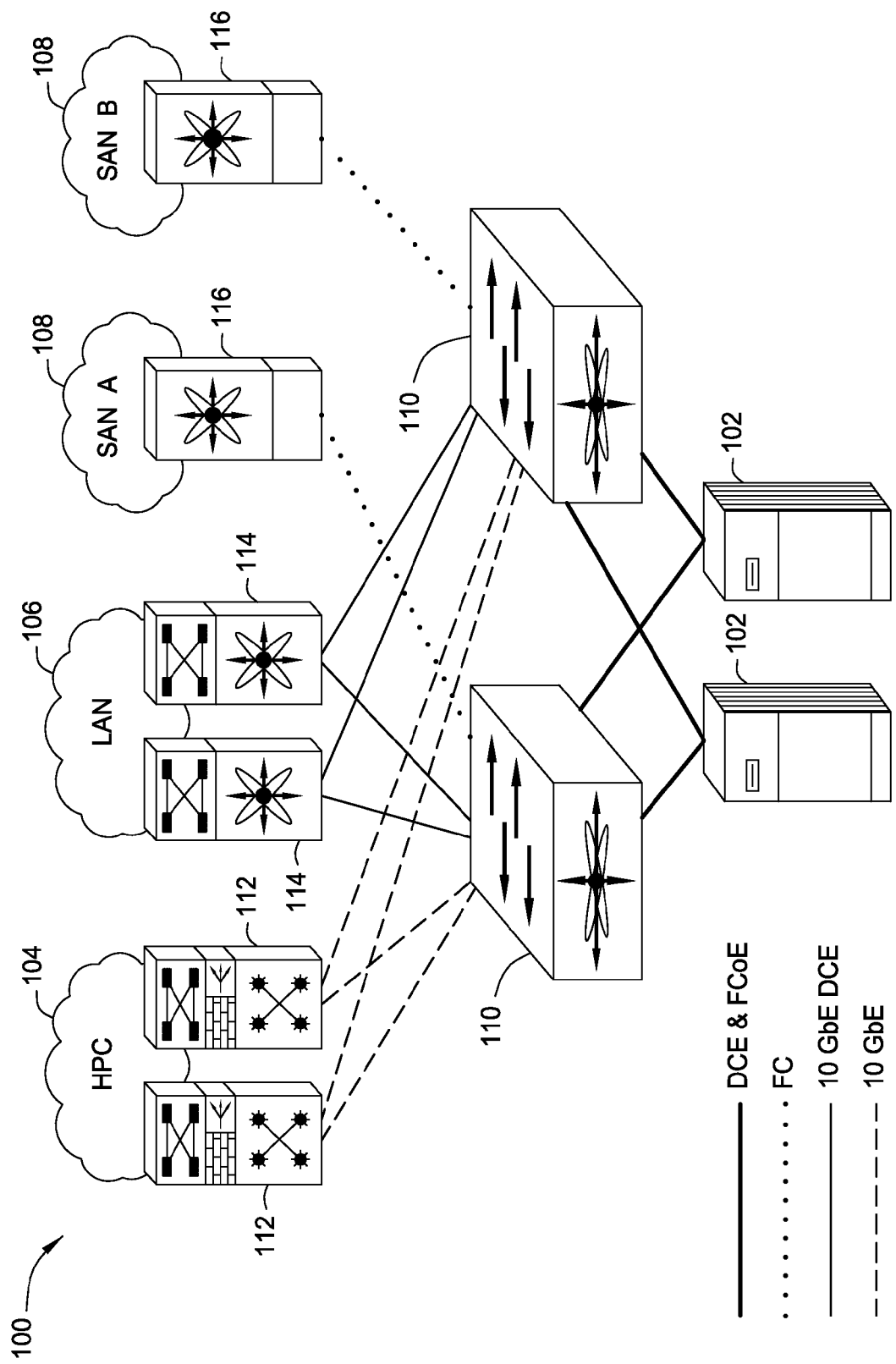
FIG. 1 illustrates an example network architecture for a data center environment, suitable for traffic between servers and local area networks (LANs), storage area networks (SANs), and/or high-performance computing (HPC) clusters, wherein at least some of the communication paths support Data Center Ethernet (DCE) and/or fibre channel over Ethernet (FCoE), in accordance with an embodiment of the present disclosure.

FIG. 1 illustrates an example network architecture 100 for a data center environment, suitable for data traffic (e.g., packets) between data center servers 102 and one or more fabrics for any of various suitable data center applications. For example, the data center servers 102 may send/receive traffic to/from a high-performance computing (HPC) cloud 104, a local area network (LAN) cloud 106, and/or a storage area network (SAN) cloud, such as a SAN A cloud and a SAN B cloud, as illustrated in FIG. 1. For redundancy in case of a server failure, the network architecture for a data center environment often includes at least two data center servers 102 as shown.

At the network access layer, each of the data center servers 102 may be connected with a data-center class switch, such as a Nexus 5000 or a Nexus 3000 switch, both available from Cisco Systems, Inc. For redundancy in case of an access layer switch failure, the network architecture for a data center environment often includes at least two access layer switches 110 as shown. The communication paths between the data center servers 102 and the access layer switches 110 may support data center bridging, such as Data Center Ethernet (DCE), and/or fibre channel over Ethernet (FCoE) for I/O consolidation as depicted in FIG. 1. For other embodiments, the servers 102 may be connected to the access layer switches via separate fibre channel (FC) and Ethernet, such as ten gigabit Ethernet (10 GbE) or enhanced Ethernet (10 GbE DCE), paths.

At the distribution layer (also known as the core layer for SANs), the access layer switches 110 may be connected with any of various suitable switches depending on the type of network fabric being routed. At least two distribution layer switches for each network cloud may be used for redundancy in case of a switch failure. HPC-compatible switches 112, for example, may be employed to route between the access layer switches 110 and the HPC cloud 104. The communication paths between the access layer switches 110 and the HPC-compatible switches 112 may support 10 GbE for fast data transfer. Data center switches 114, such as the Nexus 7000 switch available from Cisco Systems, Inc., may be utilized to route between the access layer switches 110 and the LAN cloud 106. The communication paths between the access layer switches 110 and the data center switches 114 may support Ethernet (e.g., 10 GbE) or data center bridging (10 GbE DCE). Fibre channel (FC) switching modules 116, such as the MDS 9000 switching module from Cisco Systems, Inc., may provide for routing between the access layer switches 110 and the SAN clouds 108. Native FC uplinks may be used to connect the access layer switches 110 with the FC switching modules 116, as illustrated in FIG. 1. As unified I/O (i.e., I/O consolidation) is phased in, the various types of communication paths supported may be reduced to paths supporting both DCE and FCoE using converged network adapters (CNAs), for example.

Equal-Cost Multipath (ECMP) routing is a forwarding mechanism for routing packets along multiple paths of equal cost with the goal of achieving almost equally distributed link load sharing (i.e., load balancing). However, for current ECMP routing in a data center environment, the hash function leads to all the data center nodes getting the same hash value for the same flow. Thus, the same path is used for routing packets in the data center environment flow, and the other alternate paths are underutilized.

Figure 2B:
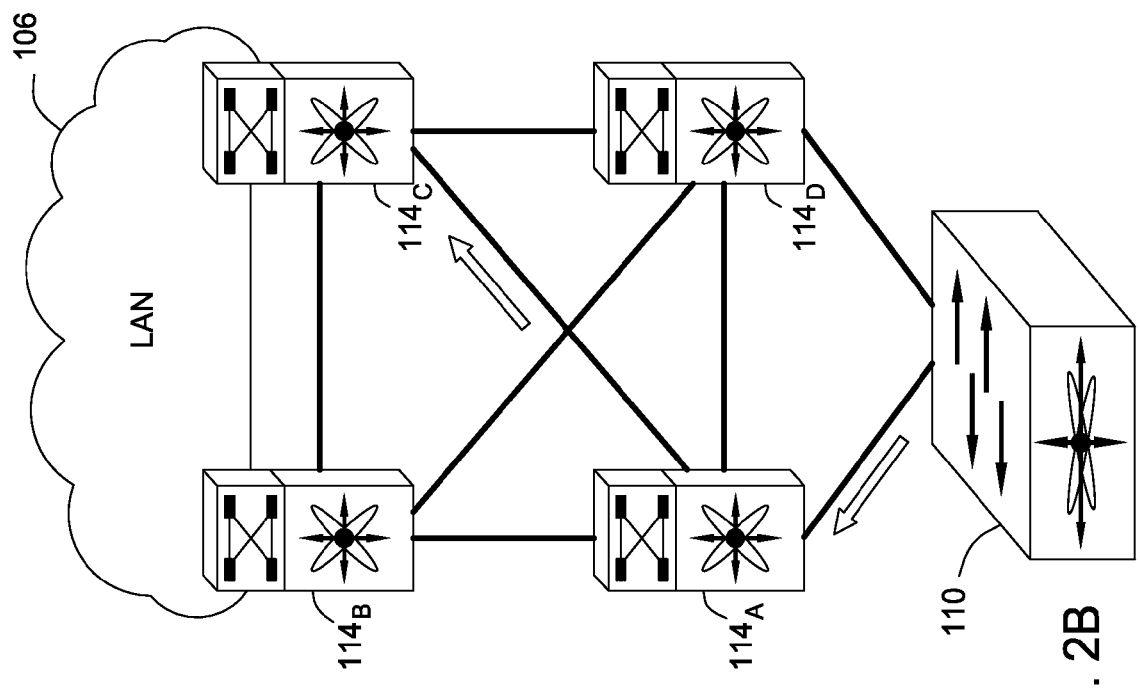
FIG. 2B illustrates forwarding data traffic along an alternate path different from the path in the data center environment of FIG. 2A due to the data center nodes receiving a different hash value, in accordance with an embodiment of the present disclosure.
Figure 2A:
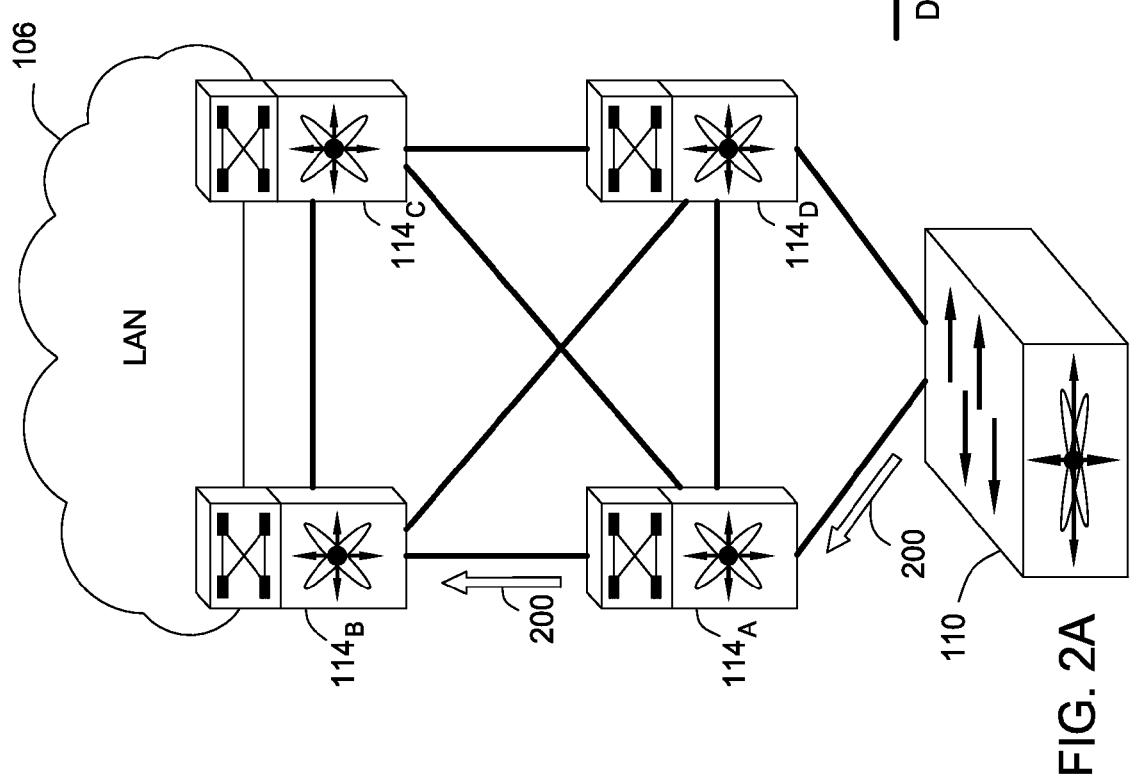
FIG. 2A illustrates continually forwarding data traffic along a single path in a portion of a data center environment supporting Equal-Cost Multi-Path (ECMP) despite the presence of alternate paths due to the data center nodes always receiving the same hash value, in accordance with an embodiment of the present disclosure.

FIG. 2A illustrates this case of continually forwarding data traffic 200 along the same, singular path in a portion of a data center environment supporting ECMP despite the presence of alternate paths between the access layer switch 110 and the LAN cloud 106. In FIG. 2A, many paths between the access layer switch 110 and the LAN cloud 106 have equal cost. However, because all of the data center nodes receive the same hash value for flow between the access layer switch 110 and the LAN cloud 106, traffic 200 is continually routed from the access layer switch 110 to the data center switch $114_A$, then to data center switch $114_B$, and then to the LAN cloud 106. Data center switches $114_C$ and $114_D$ may not be used for routing this flow's traffic, and therefore, alternate paths having equal cost may be underutilized.

Accordingly, what is needed are techniques for increased load balancing in data center environments making use of ECMP, thereby utilizing alternate paths for a given flow. One way to achieve better load balancing may be to force the hash values to be different.

An Example Load Balancing Over DCE Multipath ECMP

Figure 3:
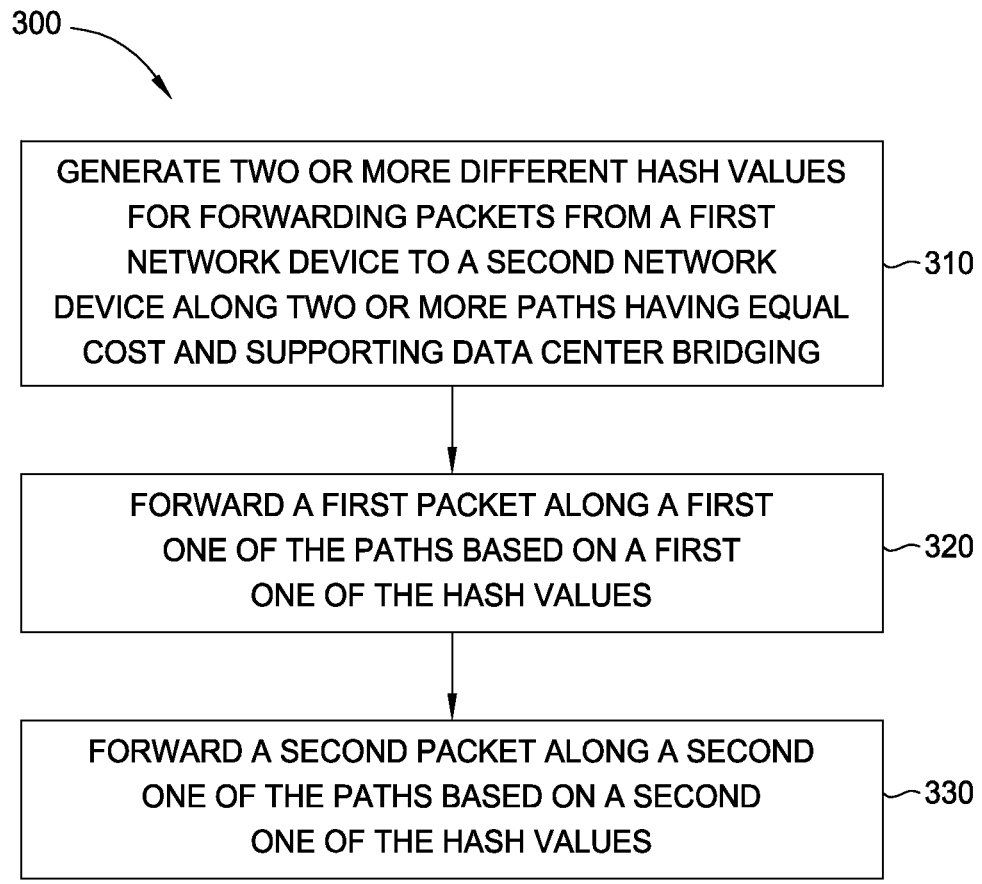
FIG. 3 illustrates example operations for generating different hash values and forwarding packets based on the hash values in an effort to achieve better load balancing and increased utilization of alternate equal-cost paths, in accordance with an embodiment of the present disclosure.

FIG. 3 illustrates example operations 300 for generating different hash values and forwarding packets based on the hash values in an effort to achieve better load balancing and increased utilization of alternate equal-cost paths. The operations 300 may begin, at 310, by generating two or more different hash values for forwarding packets from a first network device to a second network device along two or more paths having equal routing cost. The two different devices may support data center bridging, such as DCE.

There may be various suitable ways to generate different hash values. For some embodiments, the existing hash algorithm may be modified to add a step for performing a logical or mathematical operation between bits of the hash value and a unique bridge identifier (ID). Such logical or mathematical operations may include a logical OR, a logical exclusive OR (XOR), a logical Not AND (NAND), a mathematical ADD, and the like. For example, the last 2 bits of the hash value may be XORed with the last 2 bits of the bridge ID of a switch in any of the equal-cost multipaths in the data center environment. Because the bridge IDs are unique, XORing (or otherwise logically or mathematically combining) with the unique bridge IDs may most likely provide different hash values for a flow having equal-cost path options for routing traffic.

Thus, in the example of FIG. 2A, different hash values may be created by XORing with the bridge IDs of switches $114_A$ or $114_D$. As another example, the bridge IDs of switches $114_B$ or $114_C$ may be XORed to generate different hash values.

For other embodiments, the hash values constant for a given flow may be logically and/or mathematically combined (e.g., XORed) with both the bridge ID (as described above) and with some combination of Open Systems Architecture (OSA) at the edge layer, which may include a SwitchId/

SubSwitchId or other suitable type of edge layer switch identifier. Thus, different hash values may be created for a given flow in a data center environment by XORing, for example, with a unique bridge ID and also with a number of bits from the SwitchId/SubSwitchId of a switch at the edge layer of the data center environment. By performing logical and/or mathematical operations (e.g., XORing) in this manner, path polarization may be prevented.

For some embodiments, the operation for combining with the bridge ID may be different than the operation for combining with the edge layer switch identifier. For example, the hash value may be XORed with the bridge ID, and the result may be NANDed with a number of bits from the SwitchId/SubSwitchId in an effort to generate a unique hash value.

For embodiments routing FCoE traffic, a value in a field from an FC header encapsulated inside an FCoE packet may be used to generate different hash values. The generation of a hash value may be accomplished by XORing (or otherwise logically or mathematically combining) a hash value with the FC header field's value. This FC-header-field technique may be an option performed in addition to logically and/or mathematically combining (e.g., XORing) with the unique bridge ID (and optionally with the SwitchId/SubSwitchId or other edge layer switch identifier) as described above. The values in the FC header fields suitable for use in generating different hash values may be unique for the session, such as a fabric login (FLOGI), where an FC device and an FC switch establish a connection, or a port login (PLOGI), where two node ports in a fibre channel SAN establish a connection. In this manner, different hash values may be generated for different sessions, and therefore, FCoE packets from different sessions may be routed along different paths in an effort to achieve better load balancing in a data center environment with ECMP. For some embodiments, values from more than one FC header field may be used when generating the hash value at 310.

Figure 4:
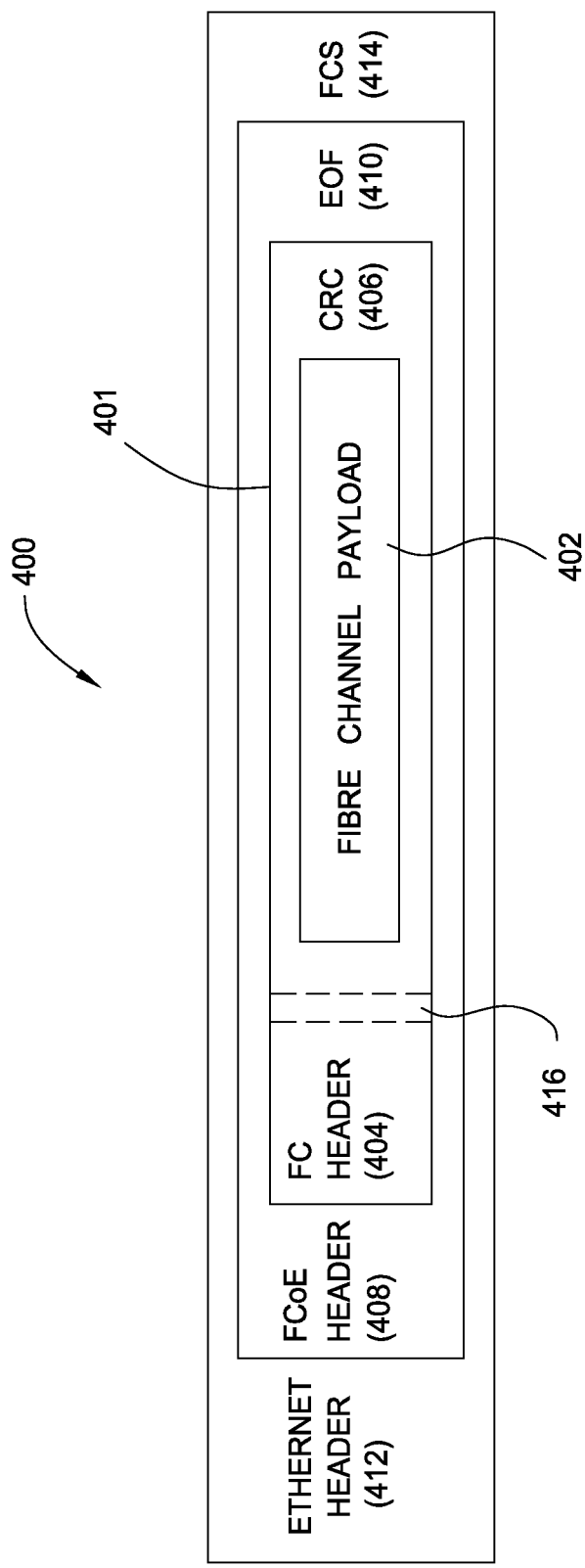
FIG. 4 illustrates an example field in a fibre channel (FC) header of an FCoE packet, the contents of which may be used to generate different hash values in accordance with an embodiment of the present disclosure.

FIG. 4 illustrates an example FCoE packet 400 in accordance with embodiments of the present disclosure. The FCoE packet 400 comprises a fibre channel (FC) frame 401, which includes an FC payload 402 preceded by an FC header and followed by a cyclic redundancy check (CRC) 406 used for error detection. To encapsulate the FC frame within an Ethernet frame, the FC frame 401 may be preceded by an FCoE header 408 and followed by an end-of-frame (EOF) delimiter 410. The FCoE header 408 may be preceded by an Ethernet header 412, and the EOF delimiter 410 may be followed by an Ethernet frame check sequence (FCS) field 414. As described above, the FC header 404 may contain one or more FC header fields 416 having one or more values used to generate different hash values.

For other embodiments, another option to generate different hash values may be to logically or mathematically combine (e.g., XOR) the hash value with the virtual network tag (VNTag) from hosts running virtual machine (VM) servers. This VNTag technique may be an option performed in addition to logically and/or mathematically combining (e.g., XORing) with the unique bridge ID (and optionally also with the SwitchId/SubSwitchId or other edge layer switch identifier) as described above. XORing—or performing other logical or mathematical operations—with the VNTag may enhance the load balancing among equal-cost paths for a given flow.

Returning to FIG. 3, a packet may be forwarded at 320 from the first network device to the second network device along a path between the devices based on one of the hash values. For example, FIG. 2A illustrates forwarding data traffic 200 from the access layer switch 110 to the LAN cloud 106 via data center switch $114_A$ and switch $114_B$.

At 330, another packet may be forwarded from the first network device to the second network device along another path between the devices (i.e., a path different from the path involved at 320) based on a different one of the hash values. For example, FIG. 2B illustrates forwarding data traffic 200 from the access layer switch 110 to the LAN cloud 106 via data center switch $114_A$ and switch $114_C$. Different hash values may have been generated between FIGS. 2A and 2B for routing the data traffic 200 according to one or more of the techniques disclosed above.

While the foregoing is directed to embodiments of the present disclosure, other and further embodiments of the disclosure may be devised without departing from the basic scope thereof, and the scope thereof is determined by the claims that follow.

The invention claimed is:

1. A method comprising:
    generating two or more different hash values for forwarding data from a first network device to a second network device along two or more paths having equal routing cost and supporting data center bridging;
    forwarding a first packet along a first path based on a first generated hash value; and
    forwarding a second packet along a second path based on a second generated hash value,
    wherein generating the two or more different hash values comprises:
        performing an operation on a hash value constant for a given flow using a first unique bridge identifier (ID) of a first network bridge in the first path to generate the first hash value; and
        performing the operation on the hash value constant for a given flow using a second unique bridge ID of a second network bridge in the second path to generate the second hash value.

2. The method of claim 1, wherein using the first unique bridge ID comprises performing a logical exclusive OR (XOR) operation with the first unique bridge ID, and wherein using the second unique bridge ID comprises performing a logical XOR operation with the second unique bridge ID.

3. The method of claim 1, wherein using the first unique bridge ID comprises performing logical exclusive OR (XOR) operations with the first unique bridge ID and with an edge layer switch identifier, and wherein using the second unique bridge ID comprises performing logical XOR operations with the second unique bridge ID and an edge layer switch identifier.

4. The method of claim 1, wherein the data comprises a fibre channel over Ethernet (FCoE) packet and generating the two or more different hash values comprises:
    using a value of a field in a fibre channel (FC) header of the FCoE packet.

5. The method of claim 4, wherein the value of the field in the FC header is unique for a FC session.

6. The method of claim 4, wherein the value of the field in the FC header is based on a fabric login (FLOGI) or a port login (PLOGI).

7. The method of claim 1, wherein generating the two or more different hash values comprises using a virtual network tag (VNTag) from a host running a virtual machine (VM) server.

8. The method of claim 1, wherein the two or more paths having equal routing cost and supporting data center bridging support Data Center Ethernet (DCE) Equal-Cost Multi-Path (ECMP) routing.

9. The method of claim 1, wherein the two or more paths support fibre channel over Ethernet (FCoE).

10. The method of claim 1, wherein the two or more paths are part of a high performance computing (HPC) fabric.

11. The method of claim 1, wherein the first network bridge and the second network bridge are each intermediate devices between the first network device and the second network device.

12. An apparatus comprising:
logic configured to generate two or more different hash values for forwarding data from the apparatus to a network device along two or more paths having equal routing cost and supporting data center bridging, to forward a first packet along a first path based on a first hash value, and to forward a second packet along a second path based on a second hash value, wherein the logic is configured to generate the hash values by:
performing an operation on a hash value constant for a given flow using a first unique bridge identifier (ID) of a first network bridge in the first path to generate the first hash value; and
performing the operation on the hash value constant for a given flow using a second unique bridge ID of a second network bridge in the second path to generate the second hash value.

13. The apparatus of claim 12, wherein using the first unique bridge ID comprises performing a logical exclusive OR (XOR) operation with the first unique bridge ID, and wherein using the second unique bridge ID comprises performing a logical XOR operation with the second unique bridge ID.

14. The apparatus of claim 12, wherein using the first unique bridge ID comprises performing logical exclusive OR (XOR) operations with the first unique bridge ID and with an edge layer switch identifier, and wherein using the second unique bridge ID comprises performing logical XOR operations with the second unique bridge ID and an edge layer switch identifier.

15. The apparatus of claim 12, wherein the data comprises a fibre channel over Ethernet (FCoE) packet and the logic is configured to generate the two or more different hash values by using a value of a field in a fibre channel (FC) header of the FCoE packet.

16. The apparatus of claim 12, wherein the logic is configured to generate the two or more different hash values by using a virtual network tag (VNTag).

17. The apparatus of claim 12, wherein the two or more paths, having equal routing cost and supporting data center bridging, support Data Center Ethernet (DCE) Equal-Cost Multi-Path (ECMP) routing, and wherein the two or more paths support fibre channel over Ethernet (FCoE).

18. The apparatus of claim 12, wherein the two or more paths are part of a high performance computing (HPC) fabric.

19. The apparatus of claim 12, wherein the first network bridge and the second network bridge are each intermediate devices between the first network device and the second network device.

* * * * *